(12) United States Patent
Asao et al.

(10) Patent No.: US 6,555,992 B2
(45) Date of Patent: Apr. 29, 2003

(54) AUTOMOTIVE ELECTRIC POWER SUPPLY ASSEMBLY

(75) Inventors: Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 26 days.

(21) Appl. No.: 09/960,346

(22) Filed: Sep. 24, 2001

(65) Prior Publication Data

US 2002/0097027 A1 Jul. 25, 2002

(30) Foreign Application Priority Data

Jan. 22, 2001 (JP) ......................................... 2001-013071

(51) Int. Cl.[7] .............................. H02P 9/02; H02P 13/06
(52) U.S. Cl. ........................................... 322/28; 322/90
(58) Field of Search ............................... 322/22, 23, 24, 322/28, 44, 46, 89, 90

(56) References Cited

U.S. PATENT DOCUMENTS

| | | | | |
|---|---|---|---|---|
| 3,809,995 A | * | 5/1974 | Hardin | .......................... 307/18 |
| 4,103,217 A | * | 7/1978 | Auinger et al. | ................. 322/28 |
| 5,066,866 A | * | 11/1991 | Hallidy | ......................... 290/1 R |
| 5,214,371 A | * | 5/1993 | Naidu | ............................ 322/29 |
| 5,510,696 A | * | 4/1996 | Naidu et al. | ................... 322/29 |
| 5,598,091 A | * | 1/1997 | Satake et al. | .................. 322/62 |
| 5,929,611 A | * | 7/1999 | Scott et al. | ..................... 322/46 |
| 6,034,511 A | * | 3/2000 | Scott et al. | ..................... 322/46 |

FOREIGN PATENT DOCUMENTS

| | | |
|---|---|---|
| JP | 4-208100 | 7/1992 |
| JP | 7-39199 | 2/1995 |

* cited by examiner

*Primary Examiner*—Nicholas Ponomarenko
(74) *Attorney, Agent, or Firm*—Sughrue Mion, PLLC

(57) ABSTRACT

A three-phase alternating-current winding is constructed by forming winding phase portions into a Y connection. The winding phase portions are divided into first and second winding divisions. Outputs from the first winding divisions are rectified and output by a first rectifier, and outputs from the second winding divisions are rectified and output by a second rectifier. In addition, a magnetizing electric current supplied to a field winding is adjusted by a voltage regulator such that the output from the second rectifier becomes constant.

12 Claims, 9 Drawing Sheets

AUTOMOTIVE ELECTRIC POWER SUPPLY ASSEMBLY

This application is based on Application No. 2001-13071, filed in Japan on Jan. 22, 2001, the contents of which are hereby incorporated by reference.

BACKGROUND OF THE INVENTION

1. Field of the Invention

The present invention relates to an automotive electric power supply assembly and particularly to an automotive electric power supply assembly capable of supplying electricity to electrical loads requiring a plurality of different voltages.

2. Description of the Related Art

Generally, an automotive vehicle is provided with an electric power supply assembly having an automotive alternator which is driven by an engine, charges a battery, and supplies electricity directly to an electrical load, etc. Conventionally, the electric power supply assembly has one voltage.

However, in recent years, rapid-defrosting electric heaters for windows and rapid heaters for automotive vehicle interiors have been installed for vehicle comfort, and catalyst heaters have been installed as exhaust-gas cleaning measures. As a result, because electrical loads have increased, the amount of electrical power consumed has increased, and conditions can no longer be handled by conventional electric power supply assemblies having one voltage, raising demand for electric power supply assemblies having a plurality of voltages.

In answer to demands for such electric power supply assemblies, automotive electric power supply assemblies capable of outputting two voltages have been proposed, for example, in Japanese Patent Laid-Open No. HEI 7-39199.

FIG. 11 is a circuit diagram of a first conventional automotive electric power supply assembly such as that disclosed in Japanese Patent Laid-Open No. HEI 7-39199, for example.

In FIG. 11, an automotive alternator 1 includes: a Y-connected three-phase alternating-current winding 2; a first rectifier 3 connected to the three-phase alternating-current winding 2 for full-wave rectification of an alternating-current output therefrom; a second rectifier 4 connected in parallel to the first rectifier 3 for full-wave rectification of the alternating-current output from the three-phase alternating-current winding 2; a field winding 7 for applying a magnetic field to the three-phase alternating-current winding 2; and a voltage regulator 8 for adjusting voltages output from the first and second rectifiers 3 and 4 by switching a magnetizing current for the field winding 7.

A first output terminal 5 of the first rectifier 3 is connected to a positive electrode of a low-voltage battery 10 through a changeover switch 14, and a negative electrode of the low-voltage battery 10 is grounded. A low-voltage electrical load 11 is connected in parallel to the low-voltage battery 10. A second output terminal 6 of the second rectifier 4 is connected to a positive electrode of a high-voltage battery 12, and a negative electrode of the high-voltage battery 12 is connected to the positive electrode of the low-voltage battery 10. A high-voltage electrical load 13 is connected in parallel to the series circuit of the low-voltage and high-voltage batteries 10 and 12.

The voltage regulator 8 includes: a first terminal 8a connected to a first end of the field winding 7; a second terminal 8b connected to an ignition switch 16 for activating the voltage regulator 8 together with the automotive vehicle by being closed when the vehicle is started; a third terminal 8c connected to a second end of the field winding 7 and connected to the first output terminal 5 through the changeover switch 14; a fourth terminal 8d connected to the second output terminal 6; and a fifth terminal 8e connected to a common terminal E.

The voltage regulator 8 is constituted by components 81 to 91. More specifically, a collector of a power transistor 81 is connected to the first terminal 8a, an emitter of the power transistor 81 is connected to the fifth terminal 8e, and a base of the power transistor 81 is connected to the second terminal 8b through a base resistor 82, the power transistor 81 switching a field current. A collector of a control transistor 83 is connected to the base of the power transistor 81, and an emitter of the control transistor 83 is connected to the fifth terminal 8e, the control transistor 83 controlling an on-off state of the power transistor 81. An anode of a Zener diode 84 is connected to a base of the control transistor 83, the Zener diode 84 activating the control transistor 83 by conducting at or above a predetermined voltage. First and second voltage-dividing resistors 85 and 86 are connected in series between the third terminal 8c and the fifth terminal 8e, the first and second voltage-dividing resistors 85 and 86 dividing and detecting a voltage from the low-voltage battery 10. Third and fourth voltage-dividing resistors 87 and 88 are connected in series between the fourth terminal 8d and the fifth terminal 8e, the third and fourth voltage-dividing resistors 87 and 88 dividing and detecting voltages from the low-voltage and high-voltage batteries 10 and 12. Moreover, the first and second voltage-dividing resistors 85 and 86 are preset such that a voltage at the third terminal 8c (the first output terminal 5) becomes a first adjusting value, and the third and fourth voltage-dividing resistors 87 and 88 are preset such that a voltage at the fourth terminal 8d (the second output terminal 6) becomes a second adjusting value that is higher than the first adjusting value. Furthermore, a first reverse-current protection diode 89 is connected between a voltage division point between the first and second voltage-dividing resistors 85 and 86 and a cathode of the Zener diode 84, a second reverse-current protection diode 90 is connected between a voltage division point between the third and fourth voltage-dividing resistors 87 and 88 and the cathode of the Zener diode 84, and a suppression diode 91 is connected between the first terminal 8a and the third terminal 8c, in other words, in parallel to the field winding 7.

Next, the operation of the first conventional automotive electric power supply assembly constructed in this manner will be explained.

First, when the ignition switch 16 is closed to start the vehicle with the changeover switch 14 closed and the first output terminal 5 and the low-voltage battery 10 connected, a base current flows from the low-voltage battery 10 through the base resistor 82 to the power transistor 81, turning the power transistor 81 on. Thus, an electric current flows from the low-voltage battery 10 through the field winding 7 and the power transistor 81. Then, a rotor (not shown) of the automotive alternator 1 is driven by the engine of the vehicle, and a low voltage suitable for charging the low-voltage battery 10 is output from the first output terminal 5. At this time, the generated electric potential at the second output terminal 6 is the same as at the first output terminal 5, but because a high electric potential from the high-voltage battery 12 is applied to the second output terminal 6, the output current is zero and electric power is not output from the second output terminal 6.

Now, the voltage regulator 8 compares a detected voltage from the first and second voltage-dividing resistors 85 and 86 (the voltage at the third terminal 8c) and the first adjusting value by means of the Zener diode 84. When the detected voltage is higher than the first adjusting value, that is, when the voltage at the voltage division point between the first and second voltage-dividing resistors 85 and 86 is higher than the Zener voltage of the Zener diode 84, the magnetizing current supplied to the field winding 7 is reduced by turning the Zener diode 84 on, turning the control transistor 83 on, and turning the power transistor 81 off. When the detected voltage is lower than the first adjusting value, the magnetizing current supplied to the field winding 7 is increased by turning the Zener diode 84 off, turning the control transistor 83 off, and turning the power transistor 81 on. Thus, the voltage at the third terminal 8c is adjusted to be constantly at the first adjusting value.

The third and fourth voltage-dividing resistors 87 and 88 are preset to the second adjusting value and a similar operation to the constant voltage control of the first adjusting value described above is performed by a logical OR operation, but when the changeover switch 14 is closed, the voltage regulator 8 operates on the basis of the first adjusting value without activating the Zener diode 84 because a terminal voltage of the high-voltage battery 12 is lower than the second adjusting value.

When the changeover switch 14 is opened, the output electric current from the first output terminal 5 is cut off and only the voltage of the low-voltage battery 10, which is lower than the first adjusting value, is applied to the third terminal 8c of the voltage regulator 8. As a result, because the Zener diode 84 is turned off, the control transistor 83 is also turned off, and the power transistor 81 is turned on, the output voltage of the automotive alternator 1 rises. Consequently, the automotive alternator 1 outputs from the second output terminal 6 a high voltage suitable for charging the high-voltage battery 12, that is, a voltage determined by the second adjusting value on the basis of the detected voltage from the third and fourth voltage-dividing resistors 87 and 88 of the voltage regulator 8.

Thus, according to this first conventional automotive electric power supply assembly, it is claimed that one of two different voltages can be stably output irrespective of the operating conditions of the engine by switching over a changeover switch 14.

Automotive electric power supply assemblies designed such that required output can be extracted from regions where rotational frequency is low through regions where rotational frequency is high have also been proposed conventionally, such as in Japanese Patent Laid-Open No. HEI 4-208100, for example.

FIG. 12 is a circuit diagram of a second conventional automotive electric power supply assembly such as disclosed in Japanese Patent Laid-Open No. HEI 4-208100, for example.

In FIG. 12, an automotive alternator 1A includes: a three-phase alternating-current winding 2A; and a field winding 7 for applying a magnetic field to the three-phase alternating-current winding 2A. The three-phase alternating-current winding 2A is constituted by Y-connected main winding portions 2-1, and auxiliary winding portions 2-2 connected in series to the main winding portions 2-1. In addition to the automotive alternator 1A, this second conventional automotive electric power supply assembly includes: a first rectifier 3 connected to the main winding portions 2-1 for full-wave rectification of an alternating current output therefrom; a second rectifier 4 connected in parallel to the first rectifier 3 for full-wave rectification of the alternating current output from the main winding portions 2-1; a third rectifier 17 connected to the auxiliary winding portions 2-2 for full-wave rectification of an alternating current output therefrom; and a voltage regulator 8A for adjusting voltages output from the first, second, and third rectifiers 3, 4, and 17 by switching a magnetizing current supplied to the field winding 7. Output from the third rectifier 17 is supplied through first and second switches SW4 and SW4' to an electrical load and a battery 18. A controller 19 is activated by a rotational frequency detection signal from the automotive alternator 1A, and operates the first and second switches SW4 and SW4' so as to turn the first and second switches SW4 and SW4' on below a predetermined rotational frequency and turn the first and second switches SW4 and SW4' off at or above the predetermined rotational frequency.

Next, the operation of the second conventional automotive electric power supply assembly constructed in this manner will be explained.

First, when the first switch SW4 is closed, an electric current flows from the battery 18 to the field winding 7, initiating excitation. In this state, a voltage is generated in the main winding portions 2-1 when a rotor (not shown) of the automotive alternator 1A is rotated. A voltage rectified by the second rectifier 4 charges the battery 18 and is supplied to the electrical load. A voltage rectified by the first rectifier 3 is applied to the field winding 7. In a steady state, the field winding 7 is excited by the voltage from the first rectifier 3.

The voltage supplied to the electrical load is kept at a predetermined value by the voltage regulator 8A in the following manner: the voltage supplied to the electrical load, which is divided by first and second voltage-dividing resistors 85 and 86, is compared to a voltage at a Zener diode 84, and if the former is greater than the latter, a control transistor 83 is turned on, and a power transistor 81 is turned off, reducing the magnetizing current supplied to the field winding 7, and if the voltage supplied to the electrical load is less than the voltage at the Zener diode 84, the control transistor 83 is turned off, and the power transistor 81 is turned on, increasing the magnetizing current supplied to the field winding 7. Thus, the voltage supplied to the electrical load is adjusted to be constant.

Now, the main winding portions 2-1, which have a small number of winds, produce almost no output when the rotational frequency is low, and do not have the capacity to recharge the battery 18 through the second rectifier 4 on their own. However, when the auxiliary winding portions 2-2 are added to the main winding portions 2-1, the battery 18 can be recharged, albeit by a low output, even if the rotational frequency is low, because the number of winds is increased.

Because the controller 19 turns the first and second switches SW4 and SW4' on if the rotational frequency is lower than the predetermined value, the output from the auxiliary winding portions 2-2 added to the main winding portions 2-1, in other words, the voltage rectified by the third rectifier 17 is supplied to the battery 18, recharging the battery 18.

If the rotational frequency rises, the output from the main winding portions 2-1 starts up, and the battery 18 is charged by the voltage from the second rectifier 4. When the rotational frequency becomes greater than the predetermined value, the controller 19 turns the first and second switches SW4 and SW4' off, and the supply of the voltage from the third rectifier 17 to the battery 18 is terminated. Thereafter, the battery is charged by the voltage from the second rectifier 4 alone.

Thus, according to this second conventional automotive electric power supply assembly, because the voltage from the third rectifier 17 is output during low-speed rotation and the voltage from the second rectifier 4 is output during high-speed rotation, it is claimed that the battery can be charged even during low-speed operation and high output can be achieved during high-speed operation.

In the first conventional automotive electric power supply assembly, because either of two different voltages can be output by switching over a changeover switch 14 in the above manner, one problem has been that the two different voltages cannot be supplied simultaneously to the low-voltage electrical load and the high-voltage electrical load.

Similarly, in the second conventional automotive electric power supply assembly, because the voltage from the third rectifier 17 is output during low-speed rotation and the voltage from the second rectifier 4 is output during high-speed rotation by turning the switches SW4 and SW4' on and off in response to the rotational frequency, one problem therewith has also been that the two different voltages cannot be supplied simultaneously to the low-voltage electrical load and the high-voltage electrical load.

SUMMARY OF THE INVENTION

The present invention aims to solve the above problems and an object of the present invention is to provide an automotive electric power supply assembly enabling at least two different voltages to be output simultaneously.

In order to achieve the above object, according to one aspect of the present invention, there is provided an automotive electric power supply assembly including:

a rotor provided with a field winding, the rotor forming a rotating magnetic field when a magnetizing electric current is supplied to the field winding;

a stator provided with at least one three-phase alternating-current winding constructed by forming three winding phase portions into a Y-connection, the stator being disposed so as to envelop the rotor and to generate an output when the rotating magnetic field is applied thereto; and a voltage regulating means for adjusting the output from the stator by controlling the magnetizing electric current supplied to the field winding, wherein each of the winding phase portions constituting the three-phase alternating-current winding is divided into a plurality of winding divisions, and outputs from the winding divisions are simultaneously extracted independently and supplied to different electrical loads.

The outputs from the winding divisions may each be subjected to full-wave rectification by an independent rectifier.

Each of the winding phase portions may be divided into first and second winding divisions.

The outputs from the first winding divisions may be adjusted so as to be constant by the voltage regulating means, the outputs from the second winding divisions being controlled so as to be constant by a voltage division ratio based on the number of turns in the winding divisions.

The first winding divisions may be winding divisions on a low-voltage side.

The first and second winding divisions may be provided with an identical number of turns.

The stator may be provided with a stator core in which slots are formed at a ratio of two per phase per pole, the slots forming six slot groups each constituted by the slots at intervals of six slots, the winding phase portions are constructed by connecting in series winding sub-portions installed in adjacent pairs of the slot groups, and the three-phase alternating-current winding is constructed by forming the winding phase portions into a Y connection.

The stator may be provided with a stator core in which slots are formed at a ratio of two per phase per pole, the slots forming six slot groups each constituted by the slots at intervals of six slots, the winding phase portions are constructed by winding sub-portions installed in each of the six slot groups, two equivalent three-phase alternating-current windings each is constructed by forming three of the winding phase portions into a Y connection, and the winding divisions constituting the winding phase portions constituting identical phases of the two three-phase alternating-current windings are connected in parallel.

DETAILED DESCRIPTION OF THE PREFERRED EMBODIMENTS

The preferred embodiments of the present invention will now be explained with reference to the drawings.

Embodiment 1

Figure 1:
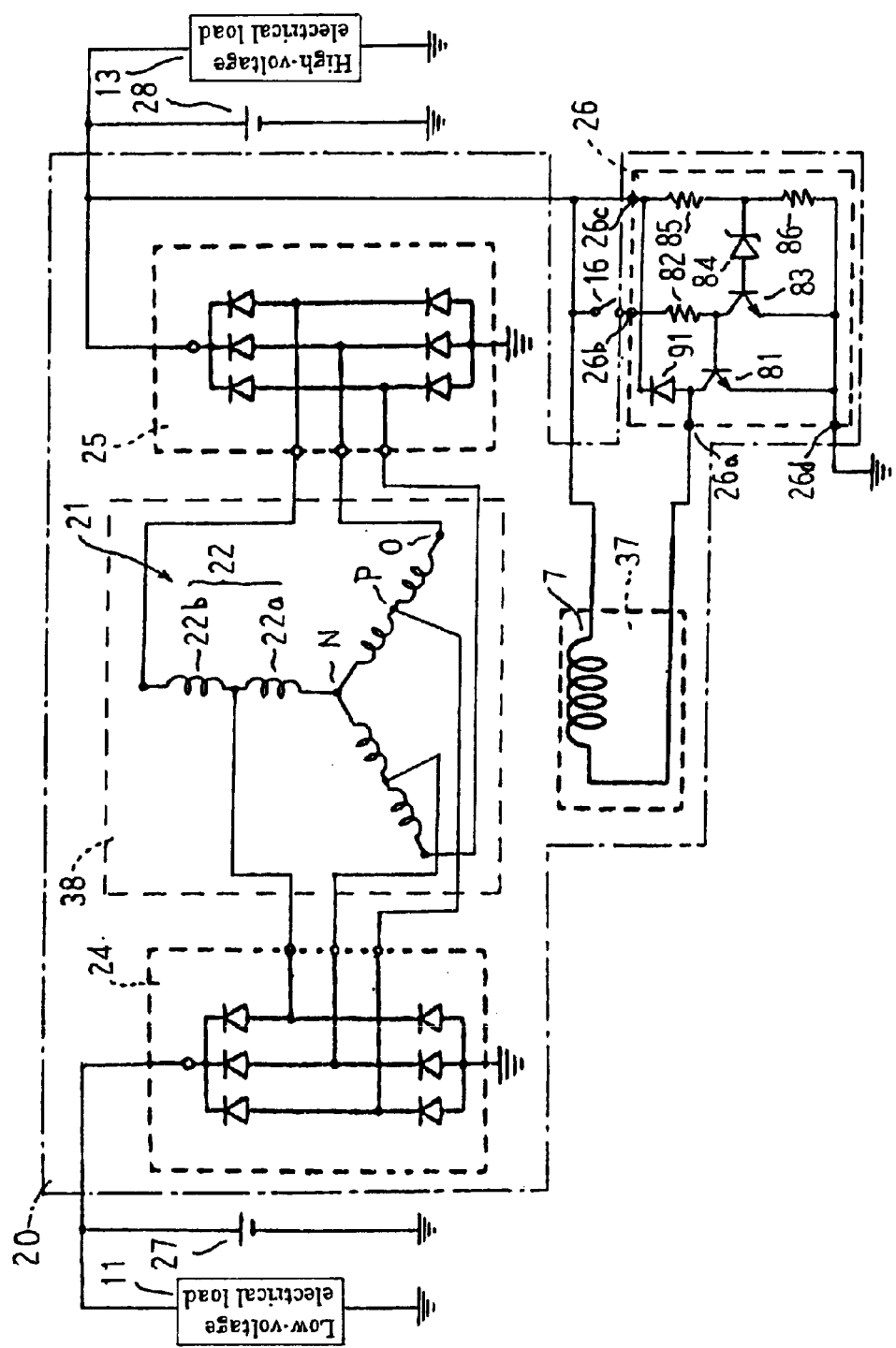
FIG. 1 is a circuit diagram of an automotive electric power supply assembly according to Embodiment 1 of the present invention.
Figure 11:
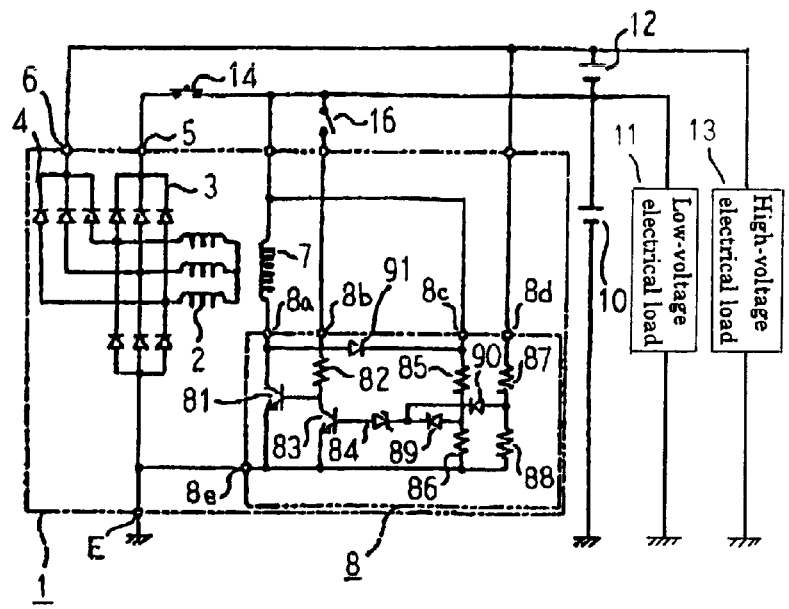
FIG. 11 is a circuit diagram of a first conventional automotive electric power supply assembly.

FIG. 1 is a circuit diagram of an automotive electric power supply assembly according to Embodiment 1 of the present invention. In this figure, portions the same as or corresponding to those in the first conventional automotive electric power supply assembly shown in FIG. 11 will be given the same numbering, and explanation thereof will be omitted.

In FIG. 1, an automotive alternator 20 includes: a three-phase alternating-current winding 21 in which three winding phase portions 22 are Y-connected, each of the winding phase portions 22 being formed by connecting a first winding division 22a and a second winding division 22b in series; a first rectifier 24 connected to each of the first winding divisions 22a, which are winding divisions of each of the winding phase portions 22, for full-wave rectification of an alternating current outputs therefrom; a second rectifier 25 connected to each of the second winding divisions 22b, which are winding divisions of each of the winding phase portions 22, for full-wave rectification of the alternating current outputs therefrom; a field winding 7 for applying a magnetic field to the three-phase alternating-current winding 21; and a voltage regulator 26 for adjusting a voltage output from the second rectifier 25 by switching a magnetizing current supplied to the field winding 7.

An output terminal of the first rectifier 24 is connected to a positive electrode of a low-voltage battery 27, and a negative electrode of the low-voltage battery 27 is grounded. A low-voltage electrical load 11 is connected in parallel to the low-voltage battery 27. An output terminal of the second rectifier 25 is connected to a positive electrode of a high-voltage battery 28, and a negative electrode of the high-voltage battery 28 is grounded. A high-voltage electrical load 13 is connected in parallel to the high-voltage battery 28.

The voltage regulator 26 includes: a first terminal 26a connected to a first end of the field winding 7; a second terminal 26b connected to an ignition switch 16 for activating the voltage regulator 26 together with the automotive vehicle by being closed when the vehicle is started; a third terminal 26c connected to a second end of the field winding 7 and the output terminal of the second rectifier 25; and a grounded fourth terminal 26d.

The voltage regulator 26 is constituted by: a power transistor 81 for switching a field current, a collector of the power transistor 81 being connected to the first terminal 26a, an emitter of the power transistor 81 being connected to the fourth terminal 26d, and a base of the power transistor 81 being connected to the second terminal 26b through a base resistor 82; a control transistor 83 for controlling an on-off state of the power transistor 81, a collector of the control transistor 83 being connected to the base of the power transistor 81 and an emitter of the control transistor 83 being connected to the fourth terminal 26d; a Zener diode 84 for activating the control transistor 83 by conducting at or above a predetermined voltage, an anode of the Zener diode 84 being connected to a base of the control transistor 83; and first and second voltage-dividing resistors 85 and 86 connected in series between the third terminal 26c and the fourth terminal 26d, the first and second voltage-dividing resistors 85 and 86 dividing and detecting a voltage from the high-voltage battery 28. Moreover, the first and second voltage-dividing resistors 85 and 86 are preset such that a voltage at the third terminal 26c becomes a predetermined adjusting value. Furthermore, a suppression diode 91 is connected between the first terminal 26a and the third terminal 26c, in other words, in parallel to the field winding 7.

Next, the operation of the automotive electric power supply assembly constructed in this manner will be explained.

First, when the ignition switch 16 is closed to start the vehicle, a base current flows from the high-voltage battery 28 through the base resistor 82 to the power transistor 81, turning the power transistor 81 on. Thus, an electric current flows from the high-voltage battery 28 through the field winding 7 and the power transistor 81, exciting the field winding 7. Then, a rotor (not shown) of the automotive alternator 20 is driven by the engine of the automotive vehicle, applying a rotating magnetic field to the three-phase alternating-current winding 21 and generating an electromotive force in the three-phase alternating-current winding 21. Alternating-current outputs from the first winding divisions 22a of the three-phase alternating-current winding 21 are converted into a direct current by the first rectifier 24, and the resulting direct-current voltage is output from the output terminal of the first rectifier 24, charging the low-voltage battery 27 and also being supplied to the low-voltage electrical load 11. Similarly, alternating-current outputs from the second winding divisions 22b are converted into a direct current by the second rectifier 25, and the resulting direct-current voltage is output from the output terminal of the second rectifier 25, charging the high-voltage battery 28 and also being supplied to the high-voltage electrical load 13.

Now, the voltage regulator 26 compares a detected voltage from the first and second voltage-dividing resistors 85 and 86 (the voltage at the third terminal 26c) and the adjusting value by means of the Zener diode 84. When the detected voltage is higher than the adjusting value, that is, when the voltage at the voltage division point between the first and second voltage-dividing resistors 85 and 86 is higher than a Zener voltage of the Zener diode 84, the magnetizing current supplied to the field winding 7 is reduced by turning the Zener diode 84 on, turning the control transistor 83 on, and turning the power transistor 81 off. When the detected voltage is lower than the adjusting value, the magnetizing current for the field winding 7 is increased by turning the Zener diode 84 off, turning the control transistor 83 off, and turning the power transistor 81 on. Thus, the voltage at the third terminal 26c, in other words, the output voltage from the second rectifier 25 is adjusted to be constantly at the adjusting value.

The output voltage from the first rectifier 24 is determined by the output voltage from the second rectifier 25 and by a ratio between the number of turns in the first winding divisions 22a and the number of turns in the winding phase portions 22 (a voltage division ratio). Thus, the output voltage from the second rectifier 25 is adjusted by the voltage regulator 26 to be constantly at the adjusting value, and the output voltage from the first rectifier 24 is adjusted to be constant by the voltage division ratio.

Thus, in this automotive electric power supply assembly, two different voltages, namely, the output voltages from the first rectifier 24 and the second rectifier 25, are stably output irrespective of the operating condition of the engine during power generation. Consequently, according to this automotive electric power supply assembly, the low-voltage electrical load 11 and the high-voltage electrical load 13 can be operated simultaneously, and the low-voltage battery 27 and the high-voltage battery 28 can also be charged.

Because the construction is such that the outputs from the first winding divisions 22a and the outputs from the second winding divisions 22b are independently subjected to full-wave rectification by the first rectifier 24 and the second rectifier 25, respectively, an automotive electric power supply assembly capable of outputting two direct-current voltages is achieved by a simple construction.

Because the winding phase portions 22 are constructed so as to be divided into the first winding divisions 22a and the second winding divisions 22b, an automotive electric power supply assembly capable of outputting two voltages can be achieved by a simple construction.

Because the output from the second rectifier 25 is adjusted by the voltage regulator 26 to be constant, and the output from the first rectifier 24 is controlled to be constant by the ratio between the number of turns in the first winding divisions 22a and the number of turns in the winding phase portions 22 (the voltage division ratio), the construction of the control circuit can be simplified. That is, the construction of the voltage regulator 26 can be simplified compared to that of the voltage regulator 8 in the first conventional automotive electric power supply assembly. Further, the controller 19 in the second conventional automotive electric power supply assembly can be omitted.

Figure 2:
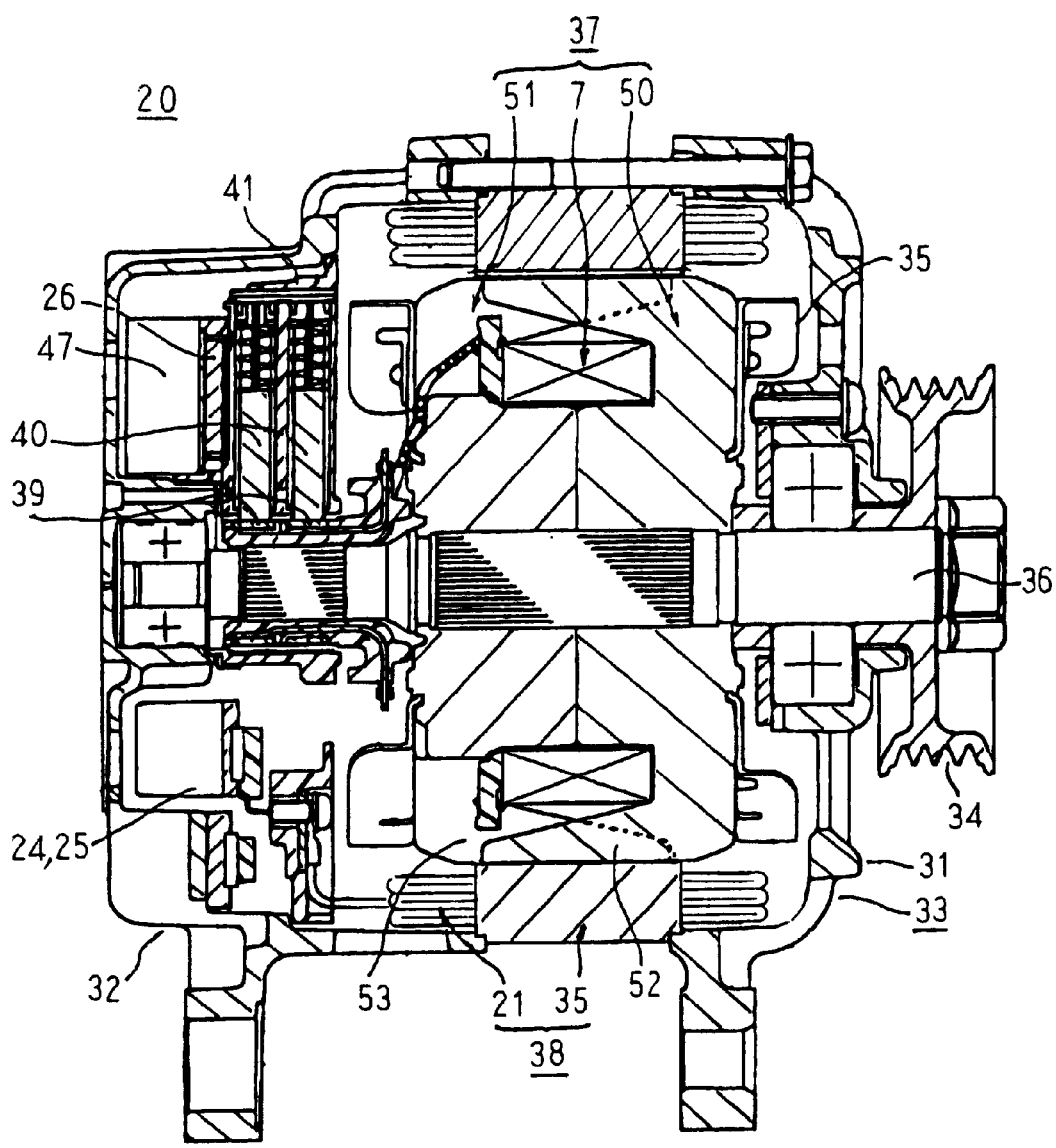
FIG. 2 is a cross section showing an automotive alternator used in the automotive electric power supply assembly according to Embodiment 1 of the present invention.
Figure 3:
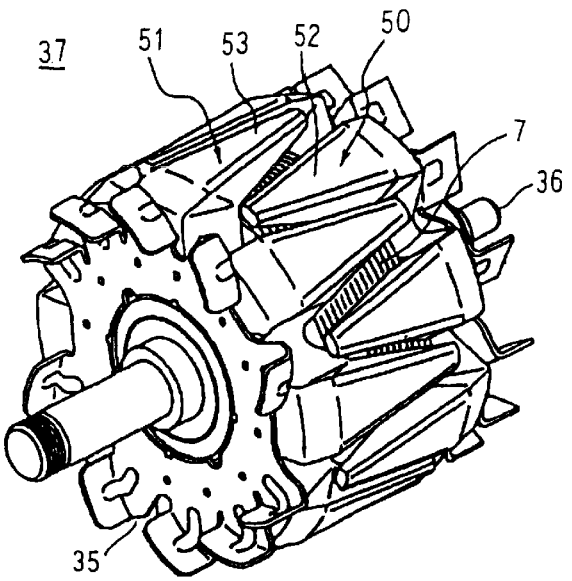
FIG. 3 is a perspective showing a rotor in the automotive alternator used in the automotive electric power supply assembly according to Embodiment 1 of the present invention.
Figure 4:
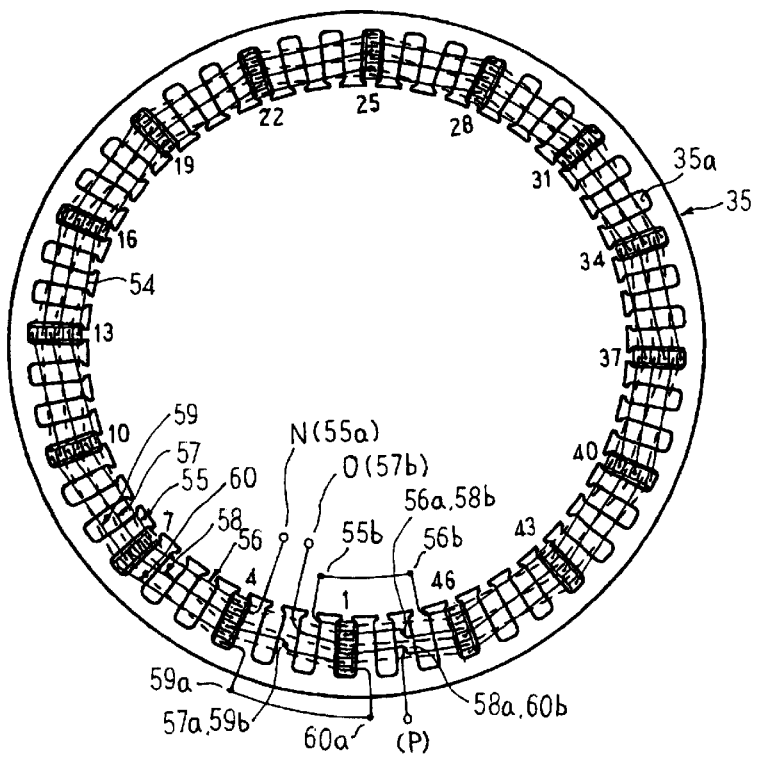
FIG. 4 is a rear end elevation of a stator core explaining connections in a winding phase portion constituting a three-phase alternating-current winding of a stator in the automotive alternator used in the automotive electric power supply assembly according to Embodiment 1 of the present invention.

Next, a specific construction of the automotive alternator 20 used in this automotive electric power supply assembly will be explained with reference to FIGS. 2 to 4. FIG. 2 is a cross section showing an automotive alternator used in the automotive electric power supply assembly according to Embodiment 1 of the present invention, FIG. 3 is a perspective showing a rotor in the automotive alternator used in the automotive electric power supply assembly according to Embodiment 1 of the present invention, and FIG. 4 is a rear end elevation of a stator core explaining connections in a winding phase portion constituting a three-phase alternating-current winding of a stator in the automotive alternator used in the automotive electric power supply assembly according to Embodiment 1 of the present invention. Moreover, in FIG. 4, solid lines represent rear-end wiring, and broken lines represent front-end wiring, respectively.

In FIGS. 2 to 4, the automotive alternator 20 includes: a case 33 constituted by an aluminum front bracket 31 and an aluminum rear bracket 32; a shaft 36 disposed inside the case 33, the shaft 36 having a pulley 34 secured to a first end thereof; a Lundell-type rotor 37 secured to the shaft 36; cooling fans 35 secured to first and second axial end portions of the rotor 37; a stator 38 secured to the case 33 so as to envelop the rotor 37; slip rings 39 secured to a second end of the shaft 36 for supplying electric current to the rotor 37; a pair of brushes 40 sliding on surfaces of the slip rings 39; a brush holder 41 accommodating the brushes 40; first and second rectifiers 24 and 25 electrically connected to the stator 38 for converting alternating current generated in the stator 38 into direct current; and a voltage regulator 26 functioning as a voltage regulating means mounted to a heat sink 47 fitted onto the brush holder 41, the voltage regulator 26 adjusting the magnitude of the alternating voltage generated in the stator 38.

The rotor 37 is constituted by: a field winding 7 for generating magnetic flux on passage of an electric current; and a pair of first and second pole cores 50 and 51 disposed so as to cover the field winding 7, magnetic poles being formed in the first and second pole cores 50 and 51 by magnetic flux generated in the field winding 7. The pair of first and second pole cores 50 and 51 are made of iron, each has a plurality of first and second claw-shaped magnetic poles 52 and 53 having a generally trapezoidal outermost diameter surface shape disposed on an outer circumferential edge portion at even angular pitch in a circumferential direction so as to project axially, and the first and second pole cores 50 and 51 are fixed to the shaft 36 facing each other such that the first and second claw-shaped magnetic poles 52 and 53 intermesh. Here, the number of magnetic poles in the rotor 37 is sixteen.

The stator 38 is constituted by: a cylindrical stator core 35 prepared by laminating a predetermined number of sheets of a magnetic steel plate, slots 35a extending axially being disposed in the cylindrical stator core 35 at an even angular pitch in a circumferential direction; and a three-phase alternating-current winding 21 installed in the stator core 35. Here, forty-eight slots 35a are formed in the stator core 35. In other words, the slots are formed at a ratio of one per phase per pole. The stator 38 is held between the front bracket 31 and the rear bracket 32 so as to form a uniform air gap between outer circumferential surfaces of the first and second claw-shaped magnetic poles 52 and 53 and an inner circumferential surface of the stator core 35.

The three-phase alternating-current winding 21 is constructed by forming three winding phase portions 22 into a Y-connection. Each of the winding phase portions 22 is constructed by winding a conductor wire 54, formed by coating a copper wire material with an electrical insulator, into a wave shape in every third slot 35a so as to extend outwards from any given slot 35a at an end surface of the stator core 35, extend circumferentially, and enter a subsequent slot 35a three slots away, groups of the slots 35a into which each of the winding phase portions 22 are installed being offset by one slot from each other.

The construction of a first winding phase portion 22 installed in a slot group constituted by the slots 35a numbered Slot Number 1, 4, etc., through 46 will now be explained in detail with reference to FIG. 4.

A first winding sub-portion 55 is formed into a wave winding having one turn by winding one conductor wire 54 into a wave shape so as to alternately occupy a second position from an inner circumferential side in a slot depth direction (hereinafter called "a second address") and a first position from the inner circumferential side (hereinafter called "a first address") in every third slot 35a starting from Slot Number 4. A second winding sub-portion 56 is formed into a wave winding having one turn by winding one conductor wire 54 into a wave shape so as to alternately occupy the second address and the first address in every third slot 35a starting from Slot Number 1. A third winding sub-portion 57 is formed into a wave winding having one turn by winding one conductor wire 54 into a wave shape so as to alternately occupy a fourth position from the inner circumferential side in the slot depth direction (hereinafter called "a fourth address") and a third position from the inner circumferential side (hereinafter called "a third address") in every third slot 35a starting from Slot Number 4. A fourth winding sub-portion 58 is formed into a wave winding having one turn by winding one conductor wire 54 into a wave shape so as to alternately occupy the fourth address and the third address in every third slot 35a starting from Slot Number 1. A fifth winding sub-portion 59 is formed into a wave winding having one turn by winding one conductor wire 54 into a wave shape so as to alternately occupy a sixth position from the inner circumferential side in the slot depth direction (hereinafter called "a sixth address") and a fifth position from the inner circumferential side (hereinafter called "a fifth address") in every third slot 35a starting from Slot Number 4. A sixth winding sub-portion 60 is formed into a wave winding having one turn by winding one conductor wire 54 into a wave shape so as to alternately occupy the sixth address and the fifth address in every third slot 35a starting from Slot Number 1.

A second end portion 55b of the first winding sub-portion 55 extending outwards at the rear end from the first address of the slot 35a numbered Slot Number 1 and a second end portion 56b of the second winding sub-portion 56 extending outwards at the rear end from the first address of the slot 35a numbered Slot Number 46 are formed into a crossover connection. A first end portion 56a of the second winding sub-portion 56 extending outwards at the rear end from the second address of the slot 35a numbered Slot Number 1 and a second end portion 58b of the fourth winding sub-portion 58 extending outwards at the rear end from the third address of the slot 35a numbered Slot Number 46 are also formed into a crossover connection. A first end portion 58a of the fourth winding sub-portion 58 extending outwards at the rear end from the fourth address of the slot 35a numbered Slot Number 1 and a second end portion 60b of the sixth winding sub-portion 60 extending outwards at the rear end from the fifth address of the slot 35a numbered Slot Number 46 are also formed into a crossover connection. A second end portion 59b of the fifth winding sub-portion 59 extending outwards at the rear end from the fifth address of the slot 35a numbered Slot Number 1 and a first end portion 57a of the third winding sub-portion 57 extending outwards at the rear end from the fourth address of the slot 35a numbered Slot Number 4 are also formed into a crossover connection. A first end portion 60a of the sixth winding sub-portion 60 extending outwards at the rear end from the sixth address of the slot 35a numbered Slot Number 1 and a first end portion 59a of the fifth winding sub-portion 59 extending outwards at the rear end from the sixth address of the slot 35a numbered Slot Number 4 are also formed into a crossover connection. A second end portion 57b of the third winding sub-portion 57 extending outwards at the rear end from the third address of the slot 35a numbered Slot Number 1 and a first end portion 55a of the first winding sub-portion 55 extending outwards at the rear end from the second address of the slot 35a numbered Slot Number 4 become an output terminal (O) and a neutral point (N), respectively.

Thus, the first winding phase portion 22, which has six turns, is constructed by connecting the first to sixth winding sub-portions 55 to 60 in series. The first winding phase portion 22 includes: a first winding division 22a having three turns in which the first, second, and fourth winding sub-portions 55, 56, and 58 are connected in series; and a second winding division 22b having three turns in which the sixth, fifth, and third winding sub-portions 60, 59, and 57 are connected in series, the first winding division 22a and the second winding division 22b being connected in series, and the connection point between the first winding division 22a and the second winding division 22b becomes an intermediate output terminal (P).

Second and third winding phase portions 22 are constructed by similarly connecting first to sixth winding sub-portions 55 to 60 installed in the stator core 35 in slot groups successively offset by one slot each.

The three-phase alternating-current winding 21 is constructed by connecting the neutral points (N) of each of the winding phase portions 22. The automotive electric power supply assembly shown in FIG. 1 is obtained by connecting the intermediate output terminals (P) of each of the winding phase portions 22 to the first rectifier 24, and connecting the output terminals (O) thereof to the second rectifier 25.

In the automotive electric power supply assembly constructed in this manner, when the automotive alternator 20 was driven with the first and second voltage-dividing resistors 85 and 86 of the voltage regulator 26 preset such that the voltage at the third terminal 26c was 27 V, a direct-current voltage of 24 V was output from the second rectifier 25. Because there are three turns in the first winding divisions 22a and three turns in the second winding divisions 22b, the ratio of the number of turns in the first winding divisions 22a to the number of turns in the winding phase portions 22 (the voltage division ratio) is 1/2, whereby a direct-current voltage of 12 V was output from the first rectifier 24, corresponding to the voltage division ratio (1/2) of the first winding divisions 22a relative to the direct-current voltage of 24 V from the second rectifier 25.

When the rotational frequency of the automotive alternator 20 was 2,000 rpm, electric power supplies of 0.9 kW from the first rectifier 24 and 0.4 kW from the second rectifier 25 were possible, and when the rotational frequency of the automotive alternator 20 was 5,000 rpm, electric power supplies of 1.1 kW from the first rectifier 24 and 1.0 kW from the second rectifier 25 were possible.

Moreover, in Embodiment 1, because the first winding divisions 22a and the second winding divisions 22b are constructed with the same number of turns, an automotive electric power supply assembly in which the ratio between the two output voltages is 1/2 can be easily achieved.

Embodiment 2

Figure 5:
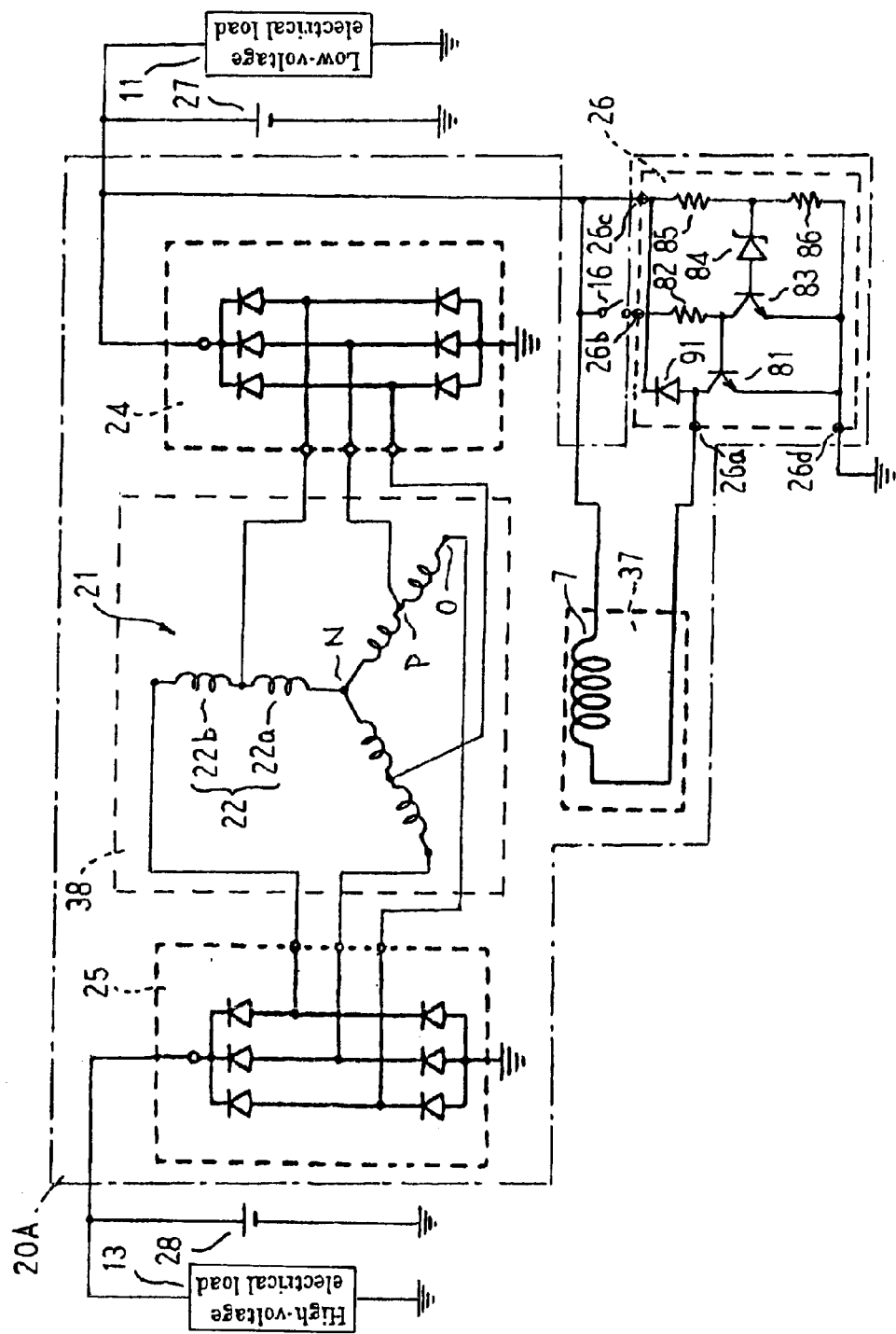
FIG. 5 is a circuit diagram of an automotive electric power supply assembly according to Embodiment 2 of the present invention.

In Embodiment 1 above, the output voltage on the six-turn side of the winding phase portions 22 is adjusted to be constant by the voltage regulator 26, but as shown in FIG. 5, in Embodiment 2, the output voltage on the three-turn side of the winding phase portions 22 is adjusted to be constant by the voltage regulator 26. Moreover, the rest of the embodiment is constructed in a similar manner to Embodiment 1 above.

In an automotive electric power supply assembly using an automotive alternator 20A constructed in this manner, two different voltages, namely, the output voltages from the first rectifier 24 and the second rectifier 25, are also stably output irrespective of the operating condition of the engine during power generation. Consequently, according to this automotive electric power supply assembly, the low-voltage electrical load 11 and the high-voltage electrical load 13 can be operated simultaneously, and the low-voltage battery 27 and the high-voltage battery 28 can also be charged.

In the automotive electric power supply assembly constructed in this manner, when the automotive alternator 20A was driven with the first and second voltage-dividing resistors 85 and 86 of the voltage regulator 26 preset such that the voltage at the third terminal 26c was 13.57 V, a direct-current voltage of 12 V was output from the first rectifier 24. Because there are three turns in the first winding divisions 22a and three turns in the second winding divisions 22b, the ratio of the number of turns in the winding phase portions 22 to the number of turns in the first winding divisions 22a (the voltage division ratio) is 2/1, whereby a direct-current voltage of 24 V was output from the second rectifier 25, corresponding to the voltage division ratio (2/1) of the winding phase portions 22 (the first winding divisions 22a plus the second winding divisions 22b) relative to the direct-current voltage of 12 V from the first rectifier 24.

When the rotational frequency of the automotive alternator 20A was 2,000 rpm, electric power supplies of 0.4 kW from the first rectifier 24 and 1.16 kW from the second rectifier 25 were possible, and when the rotational frequency of the automotive alternator 20A was 5,000 rpm, electric power supplies of 0.47 kW from the first rectifier 24 and 2.11 kW from the second rectifier 25 were possible.

Consequently, when the low-voltage output is adjusted to be constant by the voltage regulator 26, the total sum of output electrical power can be increased compared to when the high-voltage output is adjusted to be constant by the voltage regulator 26. In an actual automotive electric power supply assembly, cases in which the high-voltage electrical load 13 requires high power are more common than for the low-voltage electrical load 11, making the construction of Embodiment 2 more effective in such cases.

Embodiment 3

Figure 6:
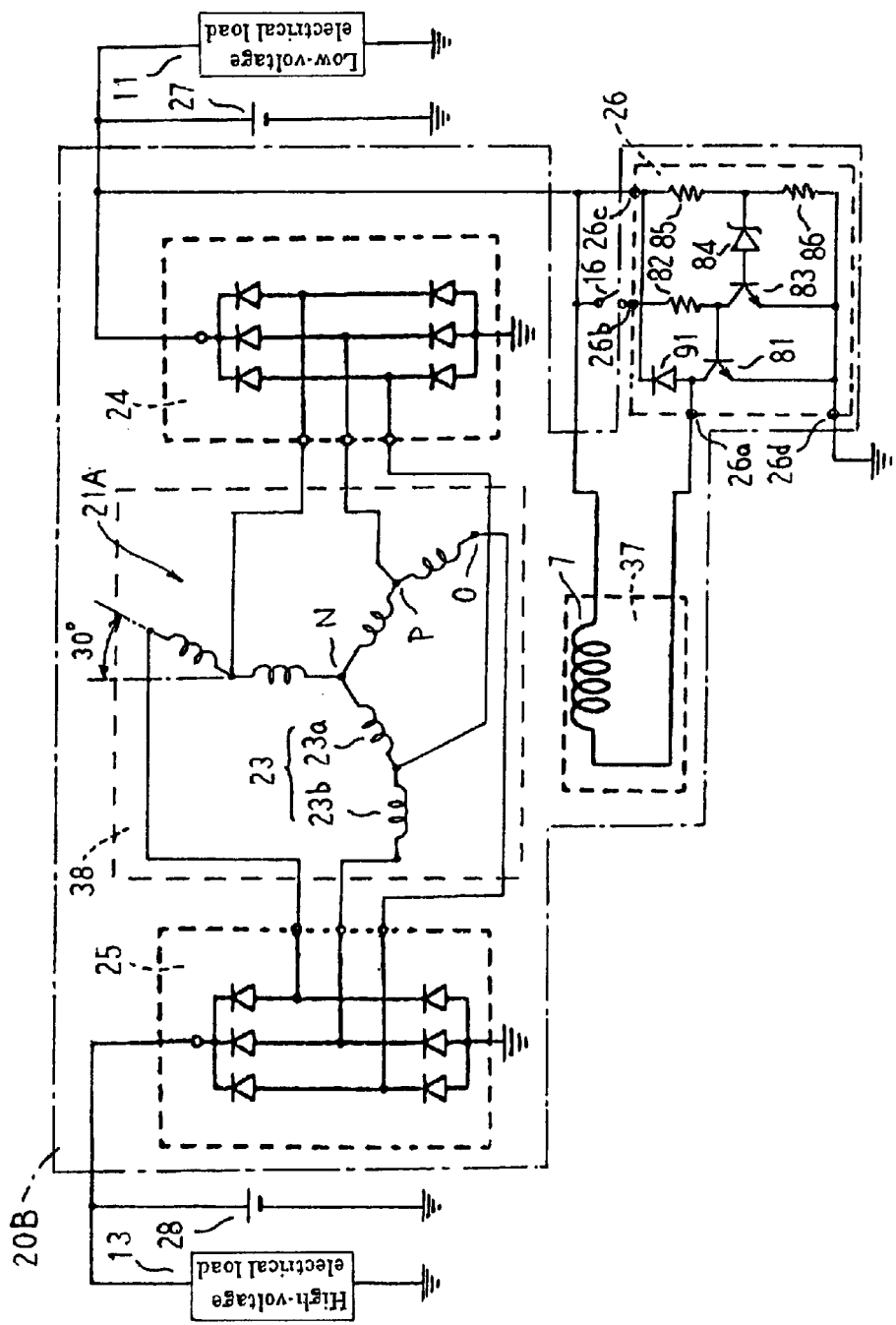
FIG. 6 is a circuit diagram of an automotive electric power supply assembly according to Embodiment 3 of the present invention.

The stator core used in Embodiment 2 above had one slot per phase per pole, but a stator core having two slots per phase per pole is used in Embodiment 3. As shown in FIG. 6, in Embodiment 3, winding phase portions 23 are each constructed by connecting a first winding division 23a and a second winding division 23b in series, the second winding division 23b being constructed so as to have a phase difference corresponding to an electrical angle of 30 degrees relative to the first winding division 23a. The rest of the embodiment is constructed in a similar manner to Embodiment 2 above.

In an automotive electric power supply assembly using an automotive alternator 20B constructed in this manner, two different voltages, namely, the output voltages from the first rectifier 24 and the second rectifier 25, are also stably output irrespective of the operating condition of the engine during power generation. Consequently, according to this automotive electric power supply assembly, the low-voltage electrical load 11 and the high-voltage electrical load 13 can be operated simultaneously, and the low-voltage battery 27 and the high-voltage battery 28 can also be charged.

According to Embodiment 3, because the second winding divisions 23b are constructed so as to have a phase difference corresponding to an electrical angle of 30 degrees relative to the first winding divisions 23a, fifth and seventh harmonics are cancelled, enabling electromagnetic noise to be reduced compared to Embodiment 2 above.

Figure 7:
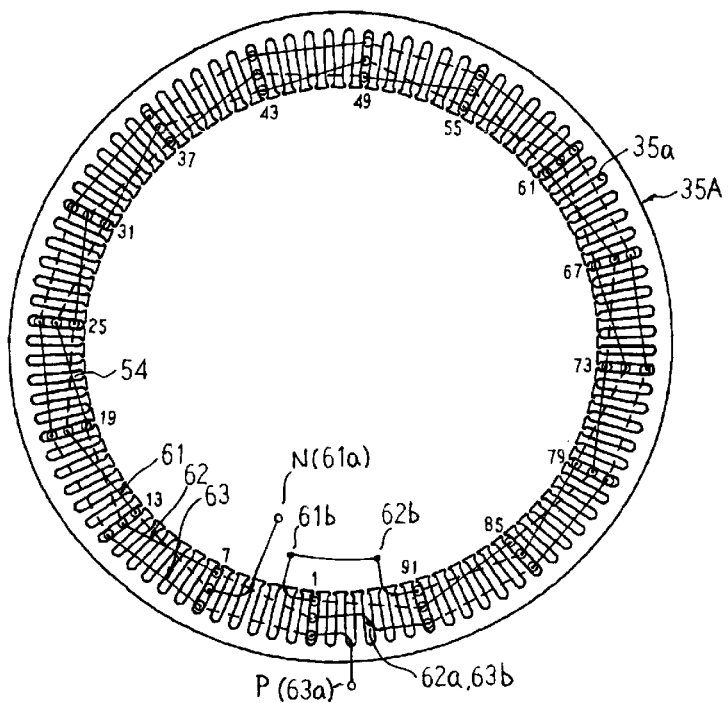
FIG. 7 is a rear end elevation of a stator core explaining connections in a first winding division of a winding phase portion constituting a three-phase alternating-current winding of a stator in an automotive alternator used in the automotive electric power supply assembly according to Embodiment 3 of the present invention.
Figure 8:
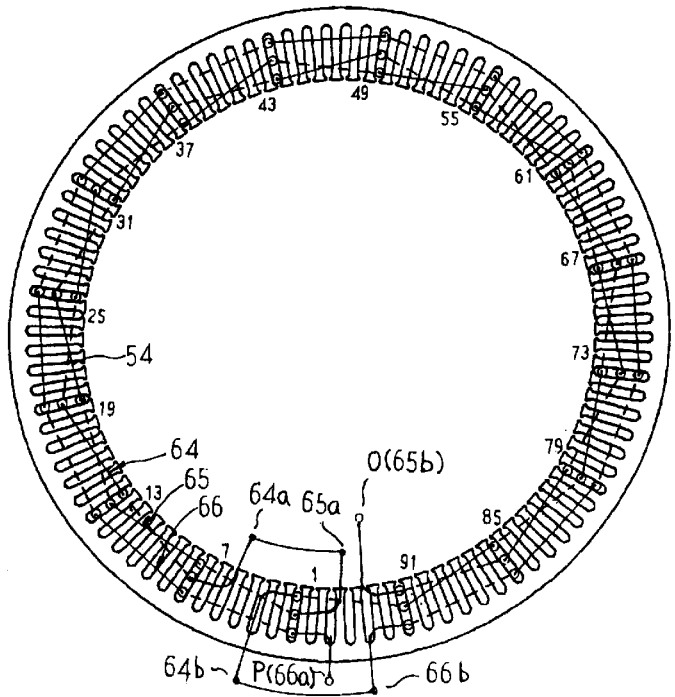
FIG. 8 is a rear end elevation of the stator core explaining connections in a second winding division of the winding phase portion constituting the three-phase alternating-current winding of the stator in the automotive alternator used in the automotive electric power supply assembly according to Embodiment 3 of the present invention.

A construction of a first winding phase portion 23 will now be explained in detail with reference to FIGS. 7 and 8. Ninety-six slots 35a are formed in a stator core 35A at an even angular pitch. Because the number of magnetic poles in the rotor 37 is sixteen, the slots are formed at a ratio of two per phase per pole. FIG. 7 shows the first winding division 23a installed in a slot group constituted by the slots 35a numbered Slot Number 1, 7, etc., through 91, and FIG. 8 shows the second winding division 23a installed in a slot group constituted by the slots 35a numbered Slot Number 2, 8, etc., through 92. In the figures, solid lines represent rear-end wiring, and broken lines represent front-end wiring, respectively.

First, in FIG. 7, a first winding sub-portion 61 is formed into a wave winding having one turn by winding one conductor wire 54 into a wave shape so as to alternately occupy the second address and the first address in every sixth slot 35a starting from Slot Number 7. A second winding sub-portion 62 is formed into a wave winding having one turn by winding one conductor wire 54 into a wave shape so as to alternately occupy the second address and the first address in every sixth slot 35a starting from Slot Number 1. A third winding sub-portion 63 is formed into a wave winding having one turn by winding one conductor wire 54 into a wave shape so as to occupy the third address in every sixth slot 35a starting from Slot Number 1.

A second end portion 61b of the first winding sub-portion 61 extending outwards at the rear end from the first address of the slot 35a numbered Slot Number 1 and a second end portion 62b of the second winding sub-portion 62 extending outwards at the rear end from the first address of the slot 35a numbered Slot Number 91 are formed into a crossover connection. A first end portion 62a of the second winding sub-portion 62 extending outwards at the rear end from the second address of the slot 35a numbered Slot Number 1 and a second end portion 63b of the third winding sub-portion 63 extending outwards at the rear end from the third address of the slot 35a numbered Slot Number 91 are also formed into a crossover connection. Thus, the first winding division 23a, which has three turns, is formed by connecting the first to third winding sub-portions 61 to 63 in series. A first end portion 61a of the first winding sub-portion 61 extending outwards at the rear end from the second address of the slot 35a numbered Slot Number 7 and a first end portion 63a of the third winding sub-portion 63 extending outwards at the rear end from the third address of the slot 35a numbered Slot Number 1 become a neutral point (N) and an intermediate output terminal (P), respectively.

Next, in FIG. 8, a fourth winding sub-portion 64 is formed into a wave winding having one turn by winding one conductor wire 54 into a wave shape so as to alternately occupy the second address and the first address in every sixth slot 35a starting from Slot Number 8. A fifth winding sub-portion 65 is formed into a wave winding having one turn by winding one conductor wire 54 into a wave shape so as to alternately occupy the second address and the first address in every sixth slot 35a starting from Slot Number 2. A sixth winding sub-portion 66 is formed into a wave winding having one turn by winding one conductor wire 54 into a wave shape so as to occupy the third address in every sixth slot 35a starting from Slot Number 2.

A second end portion 64b of the fourth winding sub-portion 64 extending outwards at the rear end from the first address of the slot 35a numbered Slot Number 2 and a second end portion 66b of the sixth winding sub-portion 66 extending outwards at the rear end from the third address of the slot 35a numbered Slot Number 92 are formed into a crossover connection. A first end portion 65a of the fifth winding sub-portion 65 extending outwards at the rear end from the second address of the slot 35a numbered Slot Number 2 and a first end portion 64a of the fourth winding sub-portion 64 extending outwards at the rear end from the second address of the slot 35a numbered Slot Number 8 are also formed into a crossover connection. Thus, the second winding division 23b, which has three turns, is formed by connecting the fourth to sixth winding sub-portions 64 to 66 in series. A first end portion 66a of the sixth winding sub-portion 66 extending outwards at the rear end from the third address of the slot 35a numbered Slot Number 2 and a second end portion 65b of the fifth winding sub-portion 65 extending outwards at the rear end from the first address of the slot 35a numbered Slot Number 92 become an intermediate output terminal (P) and an output terminal (O), respectively.

Next, the first winding phase portion 23, which has six turns, is constructed by connecting the first end portion 63a of the third winding sub-portion 63 (P) and the first end portion 66a of the sixth winding sub-portion 66 (P), in other words, by connecting the first winding division 23a and the second winding division 23a in series. Because the slot group in which the first winding division 23a is installed and the slot group in which the second winding division 23a is installed are offset by one slot, the second winding division 23a has a phase difference corresponding to an electrical angle of 30 degrees relative to the first winding division 23a. Furthermore, the first end portion 61a of the first winding sub-portion 61 and the second end portion 65b of the fifth winding sub-portion 65 become a neutral point (N) and an output terminal (O), respectively, of the first winding phase portion 23, and the connection point between the first winding division 23a and the second winding division 23b becomes an intermediate output terminal (P).

A second winding phase portion 23 is constructed by similarly connecting first to third winding sub-portions 61 to 63 installed in a slot group constituted by Slot Numbers 3, 9, etc., through 93 and fourth to sixth winding sub-portions 64 to 66 installed in a slot group constituted by Slot Numbers 4, 10, etc., through 94, and a third winding phase portion 23 is constructed by similarly connecting first to third winding sub-portions 61 to 63 installed in a slot group constituted by Slot Numbers 5, 11, etc., through 95 and fourth to sixth winding sub-portions 64 to 66 installed in a slot group constituted by Slot Numbers 6, 12, etc., through 96.

A three-phase alternating-current winding 21A is constructed by connecting the neutral points (N) of each of the winding phase portions 23. The automotive electric power supply assembly shown in FIG. 6 is obtained by connecting the intermediate output terminals (P) of each of the winding phase portions 23 to the first rectifier 24, and connecting the output terminals (O) thereof to the second rectifier 25.

In the automotive electric power supply assembly constructed in this manner, when the automotive alternator 20B was driven with the first and second voltage-dividing resistors 85 and 86 of the voltage regulator 26 preset such that the voltage at the third terminal 26c was 13.5 V, a direct-current voltage of 12 V was output from the first rectifier 24. Because there are three turns in the first winding divisions 23a and three turns in the second winding divisions 23b, the ratio of the number of turns in the winding phase portions 23 to the number of turns in the first winding divisions 23a (the voltage division ratio) is 2/1, whereby a direct-current voltage of 24 V was output from the second rectifier 25, corresponding to the voltage division ratio (2/1) of the winding phase portions 23 (the first winding divisions 23a plus the second winding divisions 23b) relative to the direct-current voltage of 12 V from the first rectifier 24.

When the rotational frequency of the automotive alternator 20B was 2,000 rpm, electric power supplies of 0.7 kW from the first rectifier 24 and 0.7 kW from the second rectifier 25 were possible, and when the rotational frequency of the automotive alternator 20B was 5,000 rpm, electric power supplies of 0.5 kW from the first rectifier 24 and 2.1 kW from the second rectifier 25 were possible.

Consequently, in Embodiment 3, because the low-voltage output is adjusted to be constant by the voltage regulator 26, the total sum of output electrical power can be increased in a similar manner to Embodiment 2 above.

Embodiment 4

Figure 9:
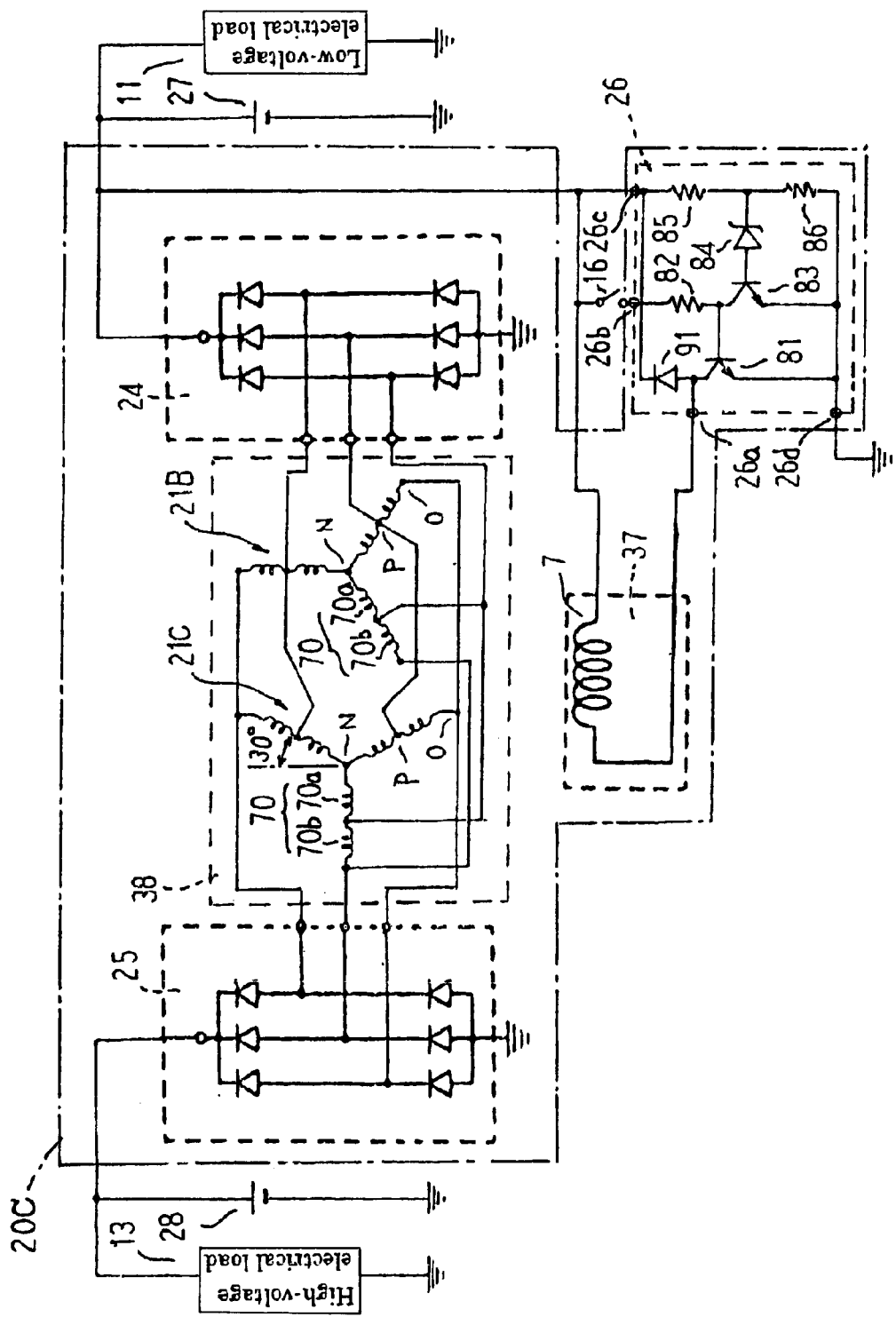
FIG. 9 is a circuit diagram of an automotive electric power supply assembly according to Embodiment 4 of the present invention.

The stator core used in Embodiment 3 above has two slots per phase per pole, and one three-phase alternating current winding 21A is constructed by forming into a Y-connection winding phase portions 23 each formed by connecting a first winding division 23a and a second winding division 23b in series, the second winding division 23b being constructed so as to have a phase difference corresponding to an electrical angle of 30 degrees relative to the first winding division 23a, but as shown in FIG. 9, the stator core used in Embodiment 4 has two slots per phase per pole, and two (first and second) three-phase alternating current windings 21B and 21C having a phase difference corresponding to an electrical angle of 30 degrees from each other are constructed by forming into a Y-connection winding phase portions 70 each formed by connecting a first winding division 23a and a second winding division 23b in series, the first winding divisions 23a and the second winding divisions 23b of the first and second three-phase alternating current windings 21B and 21C being connected in parallel. Moreover, the rest of the embodiment is constructed in a similar manner to Embodiment 3 above.

In an automotive electric power supply assembly using an automotive alternator 20C constructed in this manner, two different voltages, namely, the output voltages from the first rectifier 24 and the second rectifier 25, are also stably output irrespective of the operating condition of the engine during power generation. Consequently, according to this automotive electric power supply assembly, the low-voltage electrical load 11 and the high-voltage electrical load 13 can be operated simultaneously, and the low-voltage battery 27 and the high-voltage battery 28 can also be charged.

According to Embodiment 4, because the winding phase portions 70 of the first three-phase alternating current winding 21B and the winding phase portions 70 of the second three-phase alternating current winding 21C are constructed so as to have a phase difference corresponding to an electrical angle of 30 degrees, fifth and seventh harmonics are cancelled, enabling electromagnetic noise to be reduced in a similar manner to Embodiment 3 above.

Figure 10:
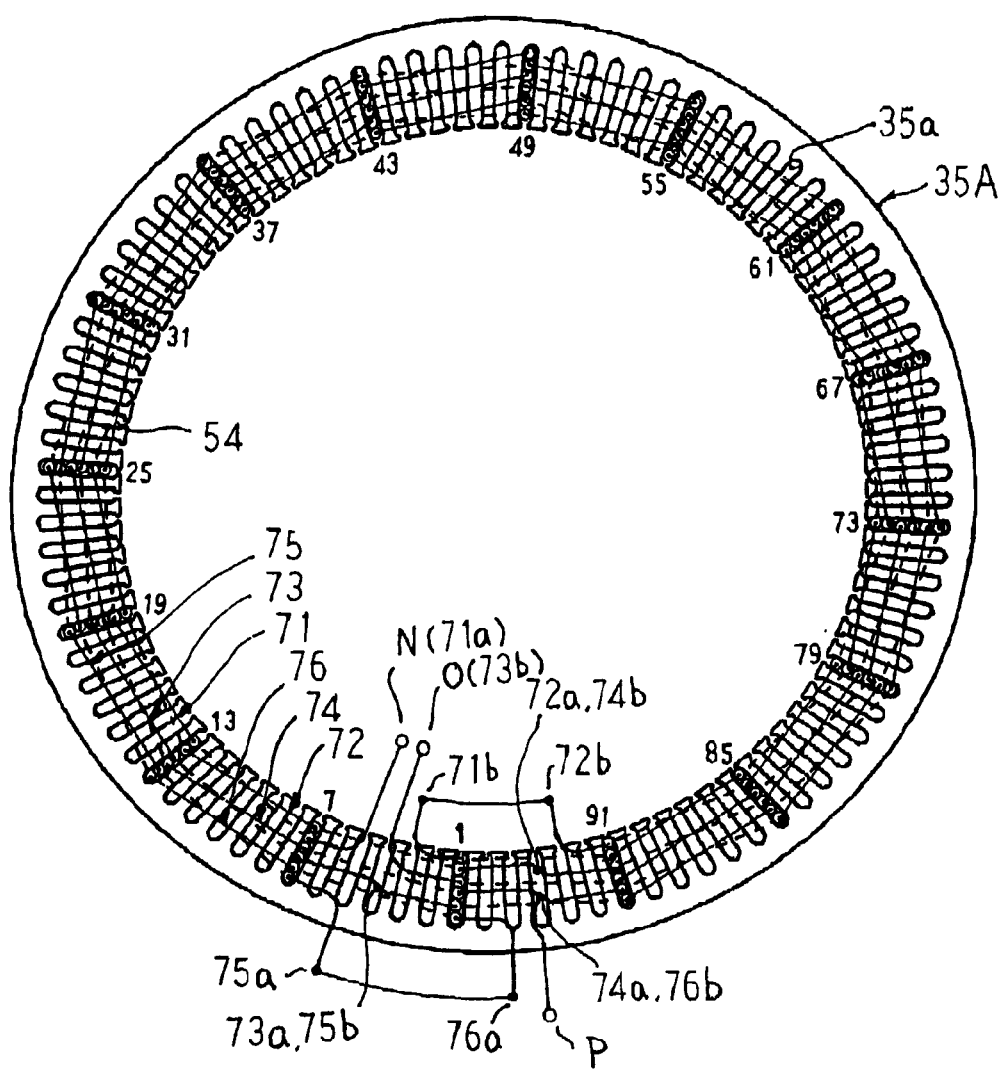
FIG. 10 is a rear end elevation of a stator core explaining connections in a winding phase portion constituting a three-phase alternating-current winding of a stator in an automotive alternator used in the automotive electric power supply assembly according to Embodiment 4 of the present invention.

A construction of a first winding phase portion 70 will now be explained in detail with reference to FIG. 10. FIG. 10 shows the first winding phase portion 70 installed in a slot group constituted by the slots 35a numbered Slot Number 1, 7, etc., through 91. In the figures, solid lines represent rear-end wiring, and broken lines represent front-end wiring, respectively.

A first winding sub-portion 71 is formed into a wave winding having one turn by winding one conductor wire 54 into a wave shape so as to alternately occupy the second address and the first address in every sixth slot 35a starting from Slot Number 7. A second winding sub-portion 72 is formed into a wave winding having one turn by winding one conductor wire 54 into a wave shape so as to alternately occupy the second address and the first address in every sixth slot 35a starting from Slot Number 1. A third winding sub-portion 73 is formed into a wave winding having one turn by winding one conductor wire 54 into a wave shape so as to alternately occupy a fourth address and a third address in every third slot 35a starting from Slot Number 7. A fourth winding sub-portion 74 is formed into a wave winding having one turn by winding one conductor wire 54 into a wave shape so as to alternately occupy the fourth address and the third address in every sixth slot 35a starting from Slot Number 1. A fifth winding sub-portion 75 is formed into a wave winding having one turn by winding one conductor wire 54 into a wave shape so as to alternately occupy a sixth address and a fifth address in every sixth slot 35a starting from Slot Number 7. A sixth winding sub-portion 76 is formed into a wave winding having one turn by winding one conductor wire 54 into a wave shape so as to alternately occupy the sixth address and the fifth address in every sixth slot 35a starting from Slot Number 1.

A second end portion 71b of the first winding sub-portion 71 extending outwards at the rear end from the first address of the slot 35*a* numbered Slot Number 1 and a second end portion 72*b* of the second winding sub-portion 72 extending outwards at the rear end from the first address of the slot 35*a* numbered Slot Number 91 are formed into a crossover connection. A first end portion 72*a* of the second winding sub-portion 72 extending outwards at the rear end from the second address of the slot 35*a* numbered Slot Number 1 and a second end portion 74*b* of the fourth winding sub-portion 74 extending outwards at the rear end from the third address of the slot 35*a* numbered Slot Number 91 are also formed into a crossover connection. A first end portion 74*a* of the fourth winding sub-portion 74 extending outwards at the rear end from the fourth address of the slot 35*a* numbered Slot Number 1 and a second end portion 76*b* of the sixth winding sub-portion 76 extending outwards at the rear end from the fifth address of the slot 35*a* numbered Slot Number 91 are also formed into a crossover connection. A second end portion 75*b* of the fifth winding sub-portion 75 extending outwards at the rear end from the fifth address of the slot 35*a* numbered Slot Number 1 and a first end portion 73*a* of the third winding sub-portion 73 extending outwards at the rear end from the fourth address of the slot 35*a* numbered Slot Number 7 are also formed into a crossover connection. A first end portion 76*a* of the sixth winding sub-portion 76 extending outwards at the rear end from the sixth address of the slot 35*a* numbered Slot Number 1 and a first end portion 75*a* of the fifth winding sub-portion 75 extending outwards at the rear end from the sixth address of the slot 35*a* numbered Slot Number 7 are also formed into a crossover connection. A second end portion 73*b* of the third winding sub-portion 73 extending outwards at the rear end from the third address of the slot 35*a* numbered Slot Number 1 and a first end portion 71*a* of the first winding sub-portion 71 extending outwards at the rear end from the second address of the slot 35*a* numbered Slot Number 7 become an output terminal (O) and a neutral point (N), respectively.

Thus, the first winding phase portion 70, which has six turns, is constructed by connecting the first to sixth winding sub-portions 71 to 76 in series. The first winding phase portion 70 includes: a first winding division 70*a* having three turns in which the first, second, and fourth winding sub-portions 71, 72, and 74 are connected in series; and a second winding division 70*b* having three turns in which the sixth, fifth, and third winding sub-portions 76, 75, and 73 are connected in series, the first winding division 70*a* and the second winding division 70*b* being connected in series, and the connection point between the first winding division 70*a* and the second winding division 70*b* becomes an intermediate output terminal (P).

Second to sixth winding phase portions 70 are constructed by similarly connecting first to sixth winding sub-portions 71 to 76 installed in the stator core 35 in slot groups successively offset by one slot each.

The first three-phase alternating-current winding 21B is constructed by connecting the neutral points (N) of the winding phase portion 70 installed in a slot group constituted by Slot Numbers 1, 7, etc., through 91, the winding phase portion 70 installed in a slot group constituted by Slot Numbers 3, 9, etc., through 93, and the winding phase portion 70 installed in a slot group constituted by Slot Numbers 5, 11, etc., through 95. Similarly, the second three-phase alternating-current winding 21C is constructed by connecting the neutral points (N) of the winding phase portion 70 installed in a slot group constituted by Slot Numbers 2, 8, etc., through 92, the winding phase portion 70 installed in a slot group constituted by Slot Numbers 4, 10, etc., through 94, and the winding phase portion 70 installed in a slot group constituted by Slot Numbers 6, 12, etc., through 96. The first and second divisions 70*a* and 70*b* of the equivalent first and second three-phase alternating-current windings 21B and 21C are connected in parallel by connecting together the intermediate output terminals (P) and the output terminals (O), respectively, of winding phase portions 70 installed in adjacent slot groups. The automotive electric power supply assembly shown in FIG. 9 is obtained by connecting the intermediate output terminals (P) of each of the winding phase portions 70 to the first rectifier 24, and connecting the output terminals (O) thereof to the second rectifier 25.

In the automotive electric power supply assembly constructed in this manner, when the automotive alternator 20C was driven with the first and second voltage-dividing resistors 85 and 86 of the voltage regulator 26 preset such that the voltage at the third terminal 26*c* was 13.5 V, a direct-current voltage of 12 V was output from the first rectifier 24. Because there are three turns in the first winding divisions 70*a* and three turns in the second winding divisions 70*b*, the ratio of the number of turns in the winding phase portions 70 to the number of turns in the first winding divisions 70*a* (the voltage division ratio) is 2/1, whereby a direct-current voltage of 24 V was output from the second rectifier 25, corresponding to the voltage division ratio (2/1) of the winding phase portions 70 (the first winding divisions 70*a* plus the second winding divisions 70*b*) relative to the direct-current voltage of 12 V from the first rectifier 24.

When the rotational frequency of the automotive alternator 20C was 2,000 rpm, electric power supplies of 0.8 kW from the first rectifier 24 and 0.8 kW from the second rectifier 25 were possible, and when the rotational frequency of the automotive alternator 20B was 5,000 rpm, electric power supplies of 0.6 kW from the first rectifier 24 and 2.2 kW from the second rectifier 25 were possible.

Consequently, in Embodiment 4, because equivalent first and second three-phase alternating-current windings 21B and 21C are constructed by forming into a Y-connection the winding phase portions 70, which have six turns, and the first and second divisions 70*a* and 70*b* of the first and second three-phase alternating-current windings 21B and 21C are connected in parallel, the total sum of output electrical power can be increased compared to Embodiment 3 above in which one three-phase alternating-current winding 21B is constructed by forming into a Y-connection the winding phase portions 23, which have six turns.

Moreover, each of the above embodiments has been explained with reference to stator cores in which the slots are formed at a ratio of one or two per phase per pole, but similar effects can also be achieved if the present invention is applied to a stator core in which slots are formed at a ratio of three or more per phase per pole.

In each of the above embodiments, the voltage regulator 26 has been used as the voltage regulating means, but the voltage regulating means is not limited to the voltage regulator 26 and may be any means capable of controlling the magnetizing current supplied to the field winding 7 such that the output voltage is constant; an electronic control unit (ECU) mounted to the automotive vehicle may be used, for example.

In each of the above embodiments, output from one or more three-phase alternating-current windings has been converted into direct current using rectifiers, but it is not always necessary to use rectifiers. In that case, the alternating-current output from the three-phase alternating-current winding is output directly.

Figure 12:
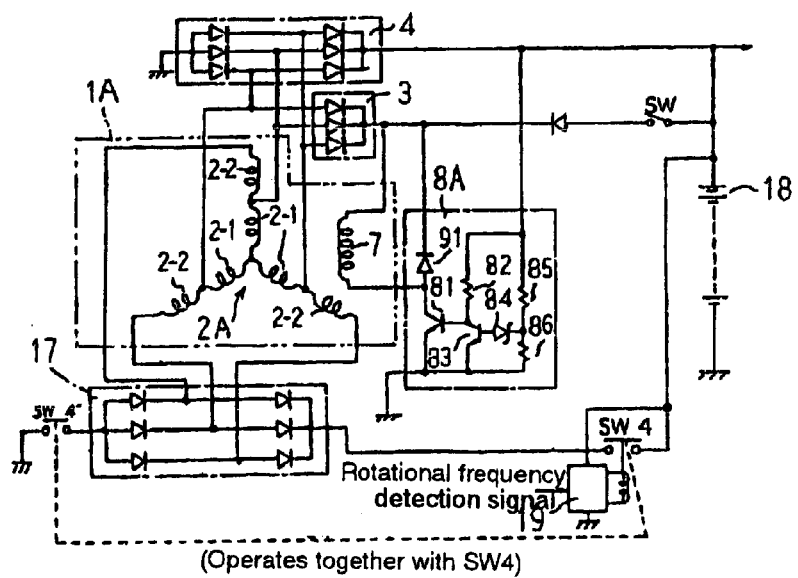
FIG. 12 is a circuit diagram of a second conventional automotive electric power supply assembly.

In each of the above embodiments, the rectifiers and the voltage regulator are mounted inside the automotive alternator, but as in the second conventional example shown in FIG. 12, the rectifiers and the voltage regulator may also be mounted outside the automotive alternator.

In each of the above embodiments, the first and second winding divisions of each of the winding phase portions are constructed with the same number of turns, but it is not necessary for the first and second winding divisions to have the same number of turns.

In each of the above embodiments, the winding phase portions are each divided into first and second winding divisions, but the number of winding divisions in the winding phase portions is not limited to two and can be adapted to the number of voltages to be output; if three voltages are required, for example, the winding phase portions may be constructed so as to be divided into three winding divisions.

In each of the above embodiments, the winding phase portions are constructed by connecting a plurality of wave windings each formed by winding one strand of conductor wire into a wave shape, but the winding phase portions are not limited to this construction and may be constructed by connecting a plurality of windings formed by linking a large number of short, U-shaped conductor wires, for example, or may also be constructed by installing annular windings into the slots at intervals of a predetermined number of slots, the annular windings each being formed by winding a slender continuous conductor for a predetermined number of winds.

In Embodiments 3 and 4 above, the slots 35a are formed at a ratio of two per phase per pole at even angular pitch, but it is not necessary for the slots 35a to be formed at an even angular pitch; the slots 35a may be formed so as to repeatedly alternate between α degrees and (60−α) degrees, for example. In that case, α would not equal 30.

The present invention is constructed in the above manner and exhibits the effects described below.

As explained above, according to one aspect of the present invention, there is provided an automotive electric power supply assembly including:

a rotor provided with a field winding, the rotor forming a rotating magnetic field when a magnetizing electric current is supplied to the field winding;

a stator provided with at least one three-phase alternating-current winding constructed by forming three winding phase portions into a Y-connection, the stator being disposed so as to envelop the rotor and to generate an output when the rotating magnetic field is applied thereto; and a voltage regulating means for adjusting the output from the stator by controlling the magnetizing electric current supplied to the field winding, wherein each of the winding phase portions constituting the three-phase alternating-current winding is divided into a plurality of winding divisions, and outputs from the winding divisions are simultaneously extracted independently and supplied to different electrical loads, thereby providing an automotive electric power supply assembly capable of simultaneously outputting a plurality of different voltages and supplying electricity to different electrical loads.

The outputs from the winding divisions may each be subjected to full-wave rectification by an independent rectifier, enabling a plurality of different direct-current voltages to be output simultaneously.

Each of the winding phase portions may be divided into first and second winding divisions, enabling two different voltages to be output simultaneously.

The outputs from the first winding divisions may be adjusted so as to be constant by the voltage regulating means, the outputs from the second winding divisions being controlled so as to be constant by a voltage division ratio based on the number of turns in the winding divisions, simplifying the construction of the voltage regulating means for controlling the magnetizing electric current supplied to the field winding.

The first winding divisions may be winding divisions on a low-voltage side, increasing the total sum of extractable output electrical power.

The first and second winding divisions may be provided with an identical number of turns, enabling two outputs in which the ratio of output voltages is 1/2 to be extracted by a simple construction.

The stator may be provided with a stator core in which slots are formed at a ratio of two per phase per pole, the slots forming six slot groups each constituted by the slots at intervals of six slots, the winding phase portions are constructed by connecting in series winding sub-portions installed in adjacent pairs of the slot groups, and the three-phase alternating-current winding is constructed by forming the winding phase portions into a Y connection. Thus, because the winding sub-portions constituting the winding phase portions are provided with a phase difference corresponding to a predetermined electrical angle, harmonic components of specific orders are cancelled, reducing electromagnetic noise.

The stator may be provided with a stator core in which slots are formed at a ratio of two per phase per pole, the slots forming six slot groups each constituted by the slots at intervals of six slots, the winding phase portions are constituted by winding sub-portions installed in each of the six slot groups, two equivalent three-phase alternating-current windings each is constructed by forming three of the winding phase portions into a Y connection, and the winding divisions constituting the winding phase portions constituting identical phases of the two three-phase alternating-current windings are connected in parallel. Thus, because the winding phase portions of the two three-phase alternating-current windings are provided with a phase difference corresponding to a predetermined electrical angle, harmonic components of specific orders are cancelled, reducing electromagnetic noise.

What is claimed is:

1. An automotive electric power supply assembly comprising:

a rotor provided with a field winding, said rotor forming a rotating magnetic field when a magnetizing electric current is supplied to said field winding;

a stator provided with at least one three-phase alternating-current winding constructed by forming three winding phase portions into a Y-connection, said stator being disposed so as to envelop said rotor and to generate an output when said rotating magnetic field is applied thereto; and a voltage regulating means for adjusting said output from said stator by controlling said magnetizing electric current supplied to said field winding, wherein each of said winding phase portions constituting said three-phase alternating-current winding is divided into a plurality of winding divisions, and outputs from said winding divisions are simultaneously extracted independently and supplied to different electrical loads.

2. The automotive electric power supply assembly according to claim 1 wherein each of said winding phase portions is divided into first and second winding divisions.

3. The automotive electric power supply assembly according to claim 2 wherein said outputs from said first winding divisions are adjusted so as to be constant by said voltage regulating means, said outputs from said second winding divisions being controlled so as to be constant by a voltage division ratio based on the number of turns in said winding divisions.

4. The automotive electric power supply assembly according to claim 3 wherein said first winding divisions are winding divisions on a low-voltage side.

5. The automotive electric power supply assembly according to claim 2 wherein said first and second winding divisions are provided with an identical number of turns.

6. The automotive electric power supply assembly according to claim 1 wherein said outputs from said winding divisions are each subjected to full-wave rectification by an independent rectifier.

7. The automotive electric power supply assembly according to claim 6 wherein each of said winding phase portions is divided into first and second winding divisions.

8. The automotive electric power supply assembly according to claim 7 wherein said outputs from said first winding divisions are adjusted so as to be constant by said voltage regulating means, said outputs from said second winding divisions being controlled so as to be constant by a voltage division ratio based on the number of turns in said winding divisions.

9. The automotive electric power supply assembly according to claim 8 wherein said first winding divisions are winding divisions on a low-voltage side.

10. The automotive electric power supply assembly according to claim 7 wherein said first and second winding divisions are provided with an identical number of turns.

11. The automotive electric power supply assembly according to claim 1 wherein said stator is provided with a stator core in which slots are formed at a ratio of two per phase per pole, said slots forming six slot groups each constituted by said slots at intervals of six slots, said winding phase portions are constructed by connecting in series winding sub-portions installed in adjacent pairs of said slot groups, and said three-phase alternating-current winding is constructed by forming said winding phase portions into a Y connection.

12. The automotive electric power supply assembly according to claim 1 wherein said stator is provided with a stator core in which slots are formed at a ratio of two per phase per pole, said slots forming six slot groups each constituted by said slots at intervals of six slots, said winding phase portions are constituted by winding sub-portions installed in each of said six slot groups, two equivalent three-phase alternating-current windings each is constructed by forming three of said winding phase portions into a Y connection, and said winding divisions constituting said winding phase portions constituting identical phases of said two three-phase alternating-current windings are connected in parallel.

* * * * *